United States Patent
Wynalda, Jr.

(10) Patent No.: US 12,063,926 B2
(45) Date of Patent: Aug. 20, 2024

(54) MOUNTING BRACKETS AND UTILITY MOUNT

(71) Applicant: Fourth Arrow, LLC, Comstock Park, MI (US)

(72) Inventor: Robert M. Wynalda, Jr., Comstock Park, MI (US)

(73) Assignee: Fourth Arrow, LLC, Comstock Park, MI (US)

(*) Notice: Subject to any disclaimer, the term of this patent is extended or adjusted under 35 U.S.C. 154(b) by 490 days.

(21) Appl. No.: 17/168,878

(22) Filed: Feb. 5, 2021

(65) Prior Publication Data

US 2022/0248662 A1  Aug. 11, 2022

(51) Int. Cl.
| | |
|---|---|
| *F16M 13/02* | (2006.01) |
| *A01M 31/02* | (2006.01) |
| *E06C 1/34* | (2006.01) |
| *E06C 1/38* | (2006.01) |
| *F41A 23/16* | (2006.01) |
| *E06C 7/50* | (2006.01) |

(52) U.S. Cl.
CPC ............ *A01M 31/02* (2013.01); *E06C 1/34* (2013.01); *E06C 1/381* (2013.01); *F16M 13/02* (2013.01); *F41A 23/16* (2013.01); *E06C 7/505* (2013.01)

(58) Field of Classification Search
CPC .......... F16M 13/02; H01Q 1/1207; G09F 2007/1804; G09F 2007/1808; G09F 2007/1813; G09F 2007/1817; G09F 2007/1821; G09F 2007/1826; G09F 2007/183

USPC ......... 248/218.4, 219.1, 219.3, 219.4, 230.8, 248/228.8
See application file for complete search history.

(56) References Cited

U.S. PATENT DOCUMENTS

| | | | |
|---|---|---|---|
| 5,060,756 A * | 10/1991 | D'Acquisto | ........ A01M 31/025 182/187 |
| 5,669,592 A | 9/1997 | Kearful | |
| 6,267,339 B1 * | 7/2001 | Gates | ..................... H01Q 1/125 248/230.8 |
| 6,966,528 B1 | 11/2005 | Hare | |
| 7,789,574 B2 | 9/2010 | Broberg | |
| 7,832,696 B2 | 11/2010 | Goodman | |
| 7,913,980 B1 * | 3/2011 | Cipriano | .................. B66D 3/08 452/187 |

(Continued)

OTHER PUBLICATIONS

Muddy Outdoors, Pages from www.gomuddy.com showing Boss Hawg Camera Arm, accessed Nov. 24, 2015, original date of publication unknown; copyright 2014.

(Continued)

*Primary Examiner* — Alfred J Wujciak
(74) *Attorney, Agent, or Firm* — Fred Zollinger

(57) ABSTRACT

A selectively adjustable and lockable utility mount is used to mount a device to a stable structure. The utility mount includes a hydraulic lock that applies the locking force that maintains the locked condition of the utility mount. Mounting brackets for utility mounts have spaced-apart mount elements that engage a surface of a stable structure. Some configurations of mounting bracket include mount elements that are movable between stored conditions and deployed conditions. The stored conditions reduce the size of the device to make it more convenient to pack. A climbing stick uses the storable mount elements.

20 Claims, 12 Drawing Sheets

(56) References Cited

U.S. PATENT DOCUMENTS

| | | | |
|---|---|---|---|
| 7,975,973 B1 | 7/2011 | Weeden | |
| 8,201,785 B2 | 6/2012 | Goodman | |
| 9,743,774 B1 | 8/2017 | Hauser | |
| 9,985,422 B2* | 5/2018 | Jett | H02B 1/50 |
| 10,398,139 B2 | 9/2019 | Wynalda, Jr. et al. | |
| 10,473,151 B2 | 11/2019 | Wynalda, Jr. et al. | |
| 10,474,013 B2 | 11/2019 | Wynalda, Jr. et al. | |
| 10,928,710 B2 | 2/2021 | Wynalda, Jr. et al. | |
| 2003/0038218 A1 | 2/2003 | Eppard et al. | |
| 2006/0197001 A1* | 9/2006 | Parker | G03B 17/561 |
| | | | 248/230.8 |
| 2006/0231707 A1* | 10/2006 | Schrot | A01M 31/02 |
| | | | 248/218.4 |
| 2009/0010637 A1 | 1/2009 | DeWitt | |
| 2010/0040360 A1* | 2/2010 | Scott | F16M 11/2064 |
| | | | 396/428 |
| 2010/0314514 A1* | 12/2010 | Nelson | F16M 11/2021 |
| | | | 248/218.4 |
| 2014/0190767 A1* | 7/2014 | Wheelington | A01M 31/02 |
| | | | 182/187 |
| 2017/0265454 A1* | 9/2017 | Kramer | A01M 31/02 |

OTHER PUBLICATIONS

Out On A Limb MfFG, Copyright 2017, publication date unknown, accessed Aug. 27, 2018, Out on a Limb Outdoor Filiming Gear, Pages from https://www.outonalimbmfg.com/outdoor-products/outdoor-filming-gear/.

* cited by examiner

MOUNTING BRACKETS AND UTILITY MOUNT

BACKGROUND OF THE DISCLOSURE

1. Technical Field

The present disclosure generally relates to mounting brackets and utility mounts for mounting or supporting items. The mounting brackets include spaced-apart, pointed feet that can grip, engage, or dig into a stable support surface to help secure the mount at a location. Some configurations of the feet are movable between stored and deployed positions. Exemplary mounts are disclosed in combination with a climbing stick and as receiving a utility mount. The disclosure also provides a utility mount configuration that uses a hydraulic lock to supply the locking force. The utility mount can be used to support a camera, a camera arm, a shooting rest, a shooting rest arm, or other devices that need to be mounted to a stable structure.

2. Background Information

Utility mounts for mounting equipment to a stable structure in an outside hunting location are known in the art. The devices and methods disclosed below provide improvements and new configurations to mounting brackets and utility mounts.

SUMMARY OF THE DISCLOSURE

The disclosure provides a selectively adjustable and lockable utility mount that is used to mount a device to a stable structure. The utility mount includes a hydraulic lock that applies the locking force that maintains the locked condition of the utility mount. Exemplary devices to be mounted include a camera, a camera arm and camera combination, a shooting rest, or a shooting rest arm and shooting rest combination. Other devices include range finders, night vision gear, binoculars, gear holders, bow rests, or other equipment used when hunting, taking photos, or exploring outside. Exemplary stable structures include tree trunks, tree branches, fence posts, or telephone poles. The utility mount also can be used inside and mounted to stable structures in the nature of poles, beams, walls, furniture and the like.

The disclosure provides different configurations of mounting brackets with spaced-apart mount elements that engage a surface of a stable structure to provide a stable configuration for the mounting brackets. Some configurations of the brackets are secured with straps that wrap around the stable structure. Some configurations of mounting bracket include mount elements that are movable between stored conditions and deployed conditions. The stored conditions reduce the size of the device to make it more convenient to pack. Embodiments of the mount elements have pointed engagement ends to grip the mount surface. The stored conditions cover the pointed engagement ends of the mount elements to prevent or limit damage to other items from the pointed engagement ends.

The disclosure provides a mounting bracket with storable mount elements.

The disclosure provides configurations wherein the mount elements are curved, pointed, and claw-shaped.

The disclosure provides a mounting bracket that can be slid onto a strap loop without requiring the strap to be fed through an opening defined by the mounting bracket.

The disclosure provides a mounting bracket in the form of a climbing stick that can be used to climb up onto a structure. The climbing stick includes upper and lower storable mount elements that pivot out to deployed conditions to bite into the structure to which the stick is mounted.

The preceding non-limiting features of the disclosures, as well as others, are more particularly described below. A more complete understanding of the devices and methods can be obtained by reference to the accompanying drawings, which are not intended to indicate relative size and dimensions of the assemblies or components thereof. In those drawings and the description below, like numeric designations refer to components of like function. Specific terms used in that description are intended to refer only to the particular structure of the embodiments selected for illustration in the drawings, and are not intended to define or limit the scope of the disclosure.

DETAILED DESCRIPTION OF THE DISCLOSURE

Figure 1:
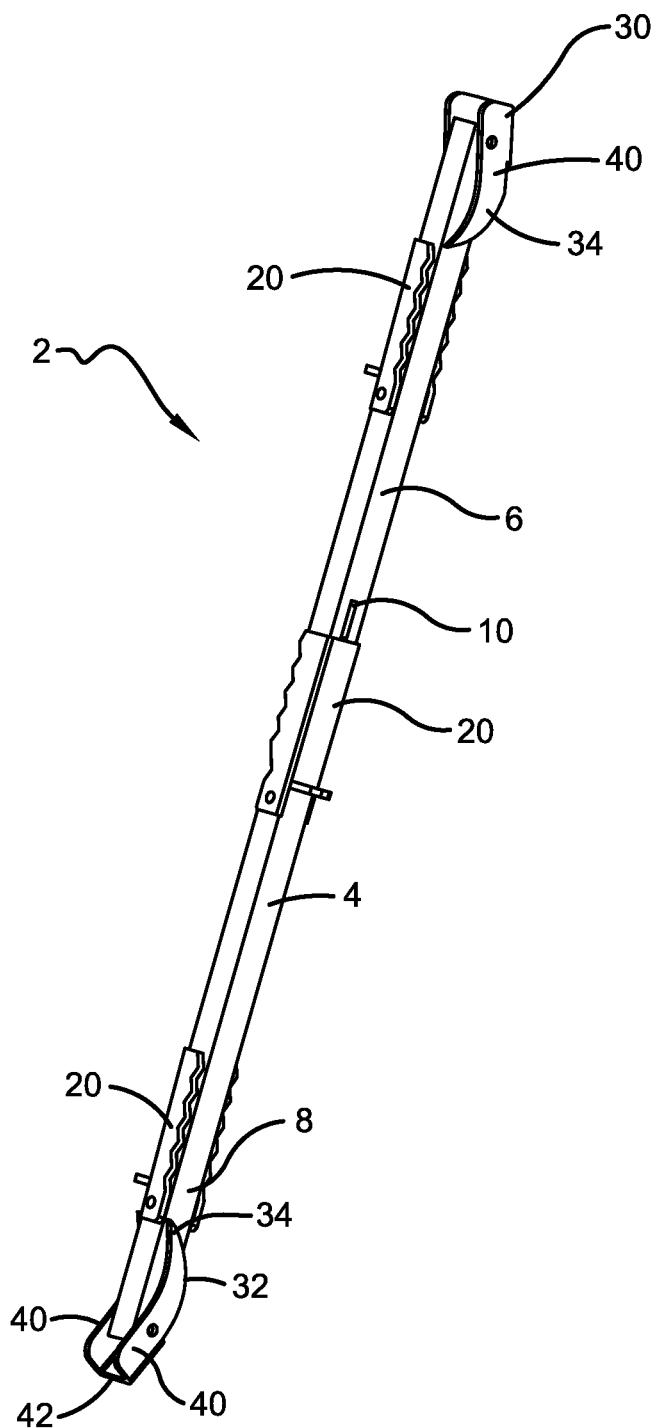
FIG. 1 is a view of a climbing stick with storable mount elements in the stored condition.
Figure 2:
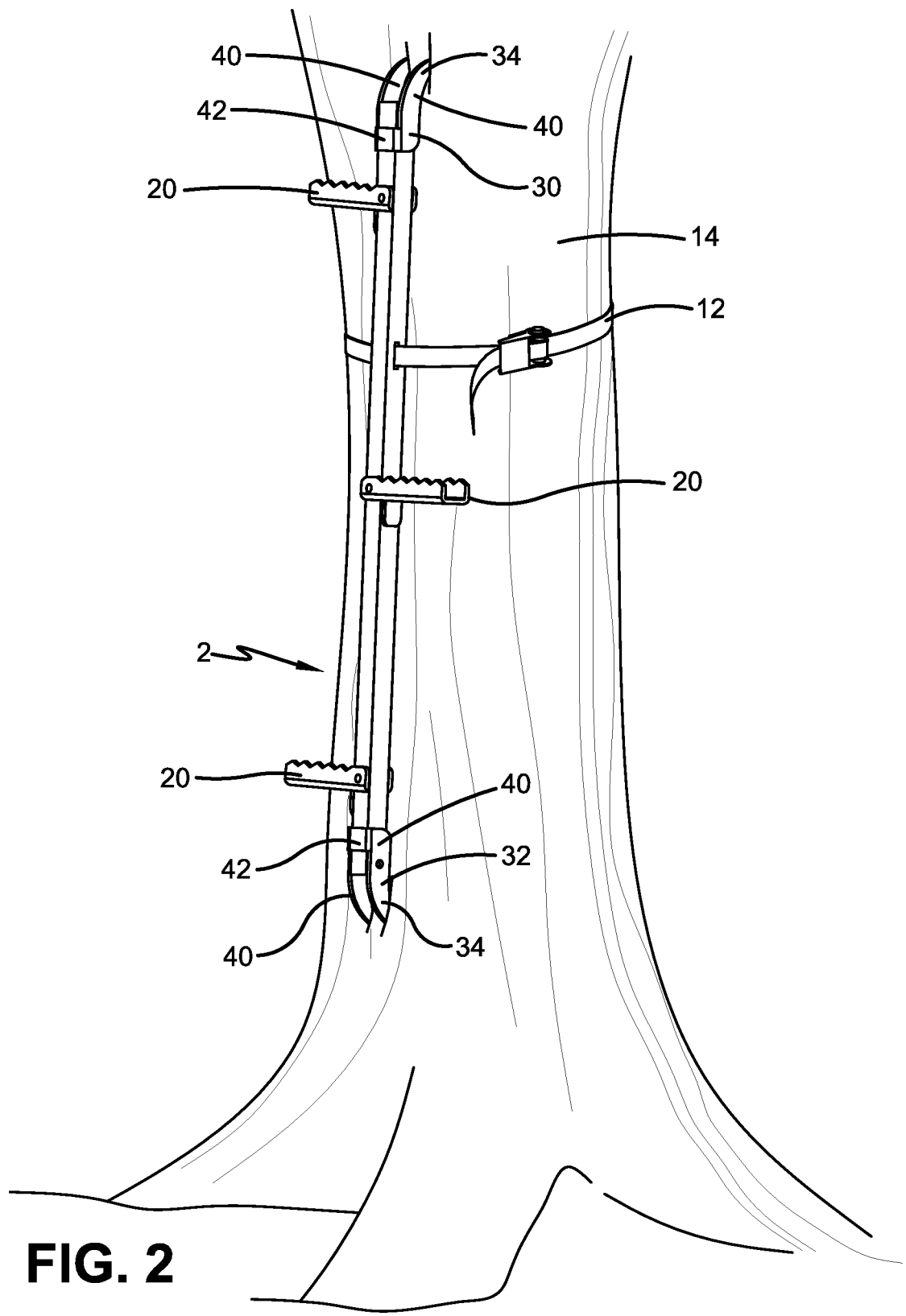
FIG. 2 is a view of the climbing stick of FIG. 1 mounted to a tree with the mount elements in the deployed condition.

An exemplary configuration of a climbing stick is indicated generally by the reference numeral 2 in FIGS. 1 and 2. Climbing stick 2 is a portable climbing device similar to a ladder that provides access to elevated locations. Climbing stick 2 generally includes a climbing stick body 4 that is elongated and has a first end portion 6, a second end portion 8, a front side, a rear side, and left and right sidewalls. The length of first 6 and second 8 end portions can be up to one third of the length of climbing stick body 4. Climbing stick body 4 can be a solid member, a rectangular or rounded hollow tube, a C or U channel, or an H beam or an I beam. Body 4 can be made from a metal, a polymer, a wood, or other rigid material. Climbing stick body 4 defines a strap opening 10 that receives a mounting strap 12 that passes through body 4 and around a stable structure 14 to secure climbing stick 2 in a useful position. Strap 12 can includes a clasp or a ratchet that allows the user to tighten strap 12 around structure 14. Strap opening 10 is disposed within first end portion 6 or closer to first end portion 6 than second end portion 8. Stable structure 14 is typically a tree trunk but also can be a tree branch, a pole, or another structure the user wishes to climb.

Climbing stick 2 also includes a plurality of steps 20 that alternate on the different sides of climbing stick body 4. Each step 20 can move between a stored condition as shown in FIG. 1 to a deployed condition as shown in FIG. 2. Each step 20 includes a stop that engages the side of stick body 4 to position the step substantially perpendicular to stick body 4. The steps are crenulated for gripping the user's foot. Folding steps 20 to the stored condition makes climbing stick 2 smaller in profile to pack for carrying.

Climbing stick 2 further includes first 30 and second 32 mount elements. First mount element 30 is connected to first end 6 of climbing stick body 4. First mount element 30 is movable between a stored condition as shown in FIG. 1 and a deployed condition as shown in FIG. 2. Second mount element 32 is connected to second end 8 of climbing stick body 4. Second mount element 32 is movable between a stored condition as shown in FIG. 1 and a deployed condition as shown in FIG. 2. Mount elements 30 and 32 are connected with a fastener such as a nut and bolt combination or with a pivot pin. Each mount element 30 and 32 has at least one pointed engagement end 34 that can bite into a surface such as a tree truck or a telephone pole to secure climbing stick 2 in place through cooperation with the strap 12. Each point comes to a tapering or sharpened point suitable for engaging stable surfaces for which stick 2 is configured to be used. For example, engagement ends 34 do not have to be as sharp for soft barks and woods compared to use on an aluminum pole. When in the deployed condition, engagement ends 34 point rearward with respect to climbing stick body 4 as shown in FIG. 2.

In the exemplary configuration, each mount element 30 and 32 includes two spaced-apart side members 40 connected together with a mount connector 42. Side members 40 can be curved, claw-shaped members. Each side member 40 has a pointed engagement end 34 such that each mount element 30 and 32 has a pair of spaced pointed engagement ends 34. When mount elements 30 and 32 are disposed in the stored condition, portions of climbing stick body 4 are disposed between side members 40 and between engagement ends 34 to protect the user and other equipment. When in the deployed condition, mount connectors 42 are disposed against portions of climbing stick body 4 to function as stops to place mount elements 30 and 32 in the correct position for use.

Figure 3:
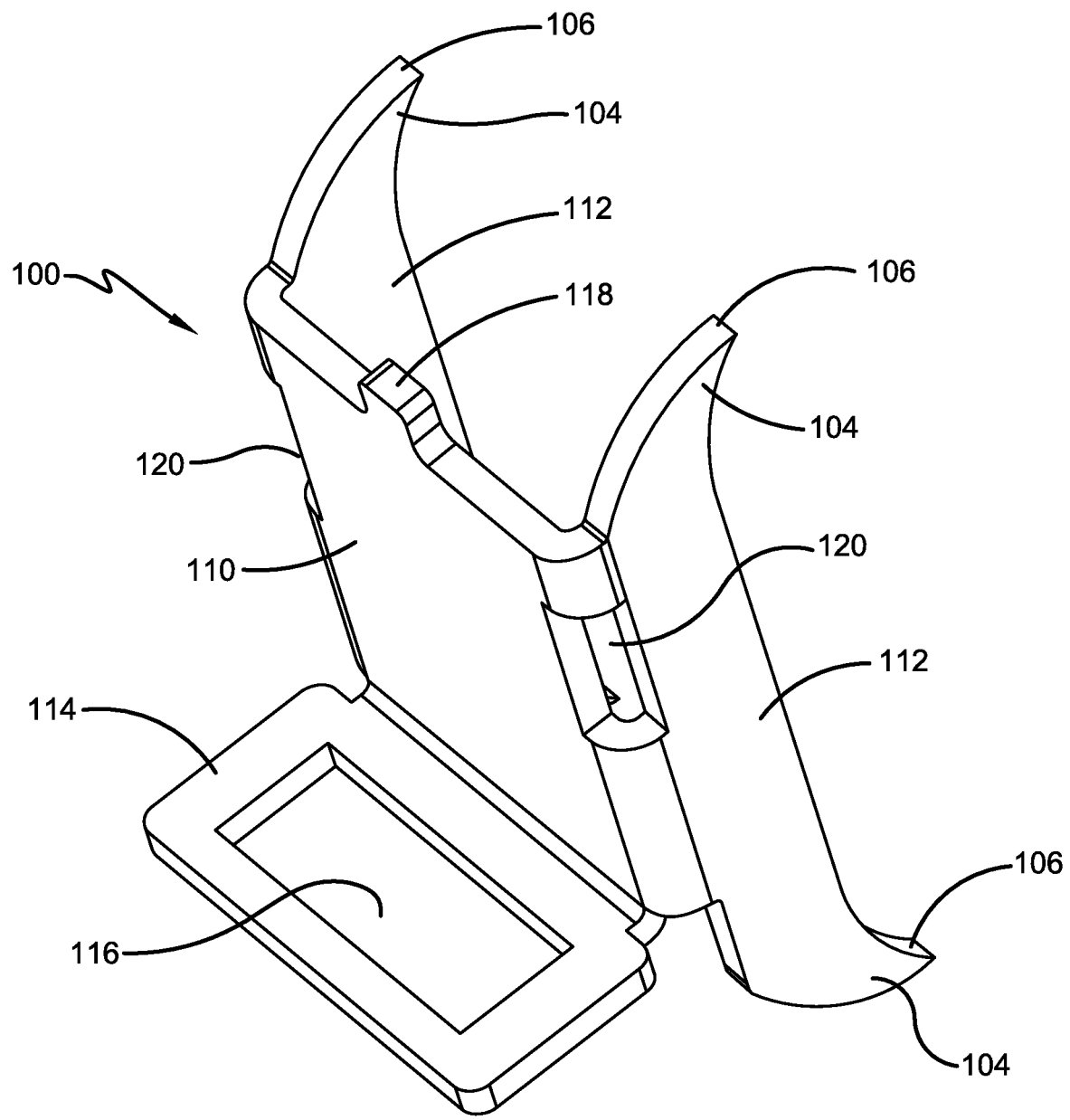
FIG. 3 is a view of a first configuration of a utility mount mounting bracket with fixed mount elements.
Figure 4:
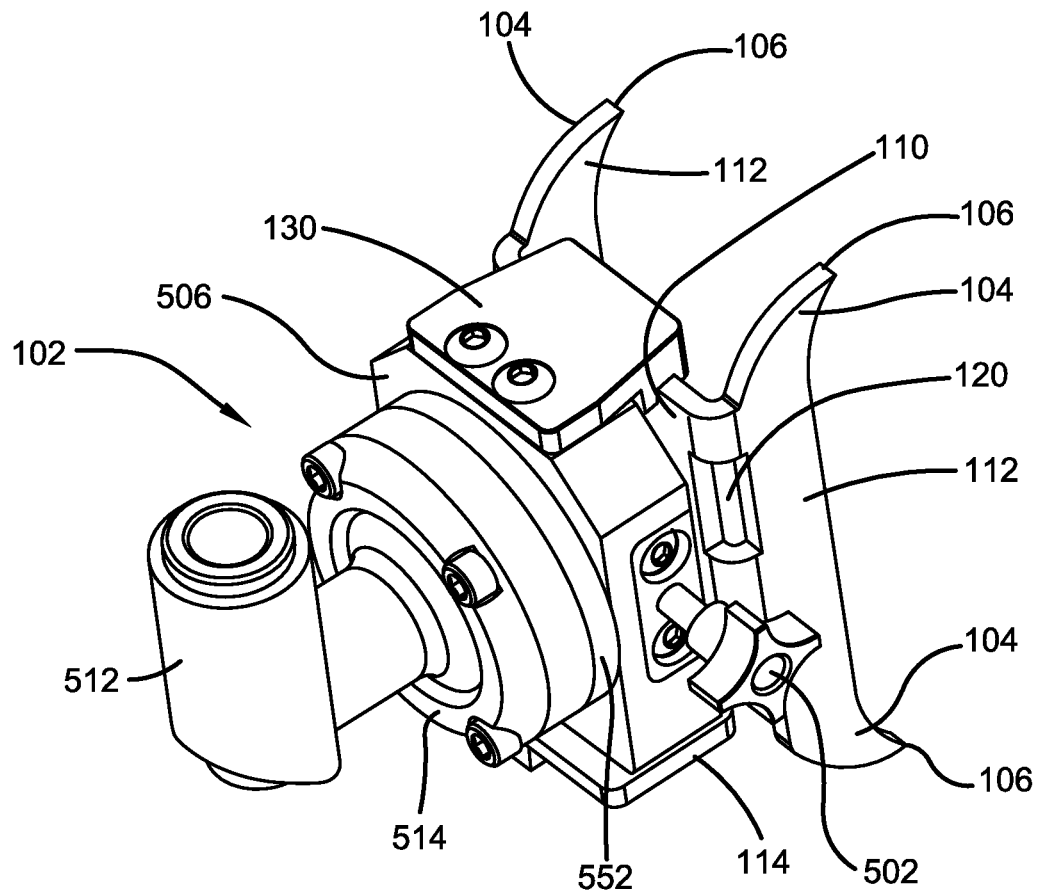
FIG. 4 is a view of an adjustable utility mount carried by the mounting bracket of FIG. 3.

A first configuration of a mounting bracket for a utility mount is indicated generally by the reference numeral 100 in FIGS. 3 and 4. Mounting bracket 100 is configured to mount a utility mount 102 in a stable configuration to a stable structure 14. Mounting bracket 100 is secured to stable structure 14 with strap 12 which may be tightened with a ratchet. Mounting bracket 100 includes a plurality of mount elements 104 that have engagement ends 106 that engage stable structure 14 and can bite into structures such as wood to increase the stability of mounting bracket 100. Each mount element 104 extends rearwardly from mounting bracket 100. Each engagement end 106 comes to a tapered point suitable for engaging stable surfaces for which mounting bracket 100 is configured to be used. In the exemplary configuration, the edges of mount elements 104 define a curved taper like a claw. The point can be in two or three dimensions with the two dimension version (constant thickness) depicted in the drawings.

Mounting bracket 100 generally includes a front wall 110, sidewalls 112, and a mount 114 that defines an opening 116 adapted to receive a portion of utility mount 102. Front wall 110 is solid in the exemplary configuration. Other configurations of front wall 110 include fastener openings or openings to reduce the weight of front wall 110. Further configurations of front wall 110 are made up of a plurality of elements that cooperate together to define front wall 110 such as a plurality of spaced bars or beams or a plurality of overlapping elements. These provide a structure to which utility mount 102 is fastened and from which sidewalls 112 project rearwardly. A projection 118 extends upwardly from a portion of front wall 110. Two mount elements 104 are disposed above (and rearwardly of) the top of front wall 110 and two mount elements 104 are disposed below (and rearwardly of) the bottom of front wall 110. Each sidewall 112 has one upper and one lower mount element 104 disposed in the same reference plane as the sidewall 112. In a manner similar to front wall 110, each sidewall 112 can be made up of different elements that project rearwardly from front wall 110 in order to support mount elements 104. Sidewalls 112 can define openings and do not have to be continuous, flat plates.

Mounting bracket 100 defines strap openings 120 between front wall 110 and sidewalls 112. Strap openings 120 are closer to the top of front wall 110 than its bottom.

Utility mount 102 is connected to mounting bracket 100 in FIG. 4 with a portion of utility mount 102 extending through opening 116. In this configuration, a lock plate 130 extends between a portion of the top of utility mount 102 and the top of mounting bracket 100. In this configuration, the bottom rear portion of lock plate 130 defines a slot 132 (FIG. 8) that receives the upper end of front wall 110. Within slot 132, lock plate 130 defines a recess that receives projection 118 to limit lateral movement of utility mount 102. In other configurations, utility mount 102 can be connected to mounting bracket 100 with fasteners (see FIGS. 5-6 for examples).

Figure 5:
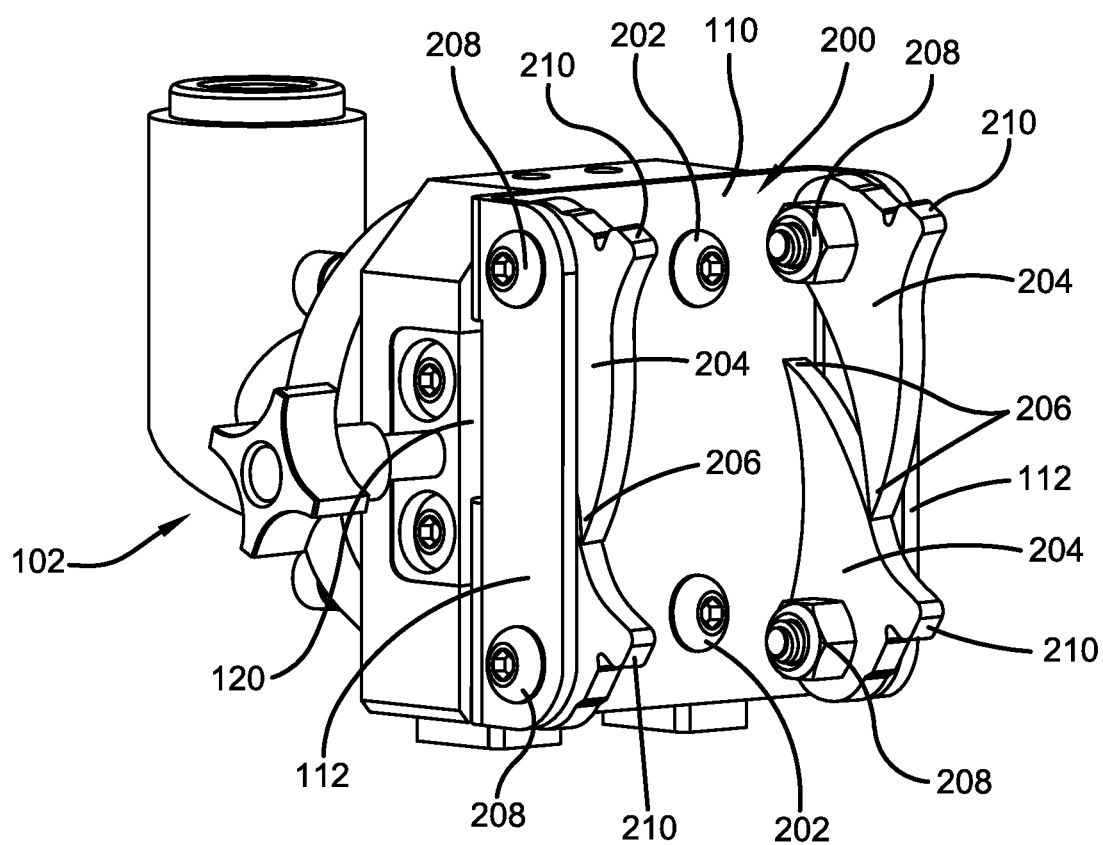
FIG. 5 is a view of a second configuration of a utility mount mounting bracket with storable mount elements in the stored condition.
Figure 6:
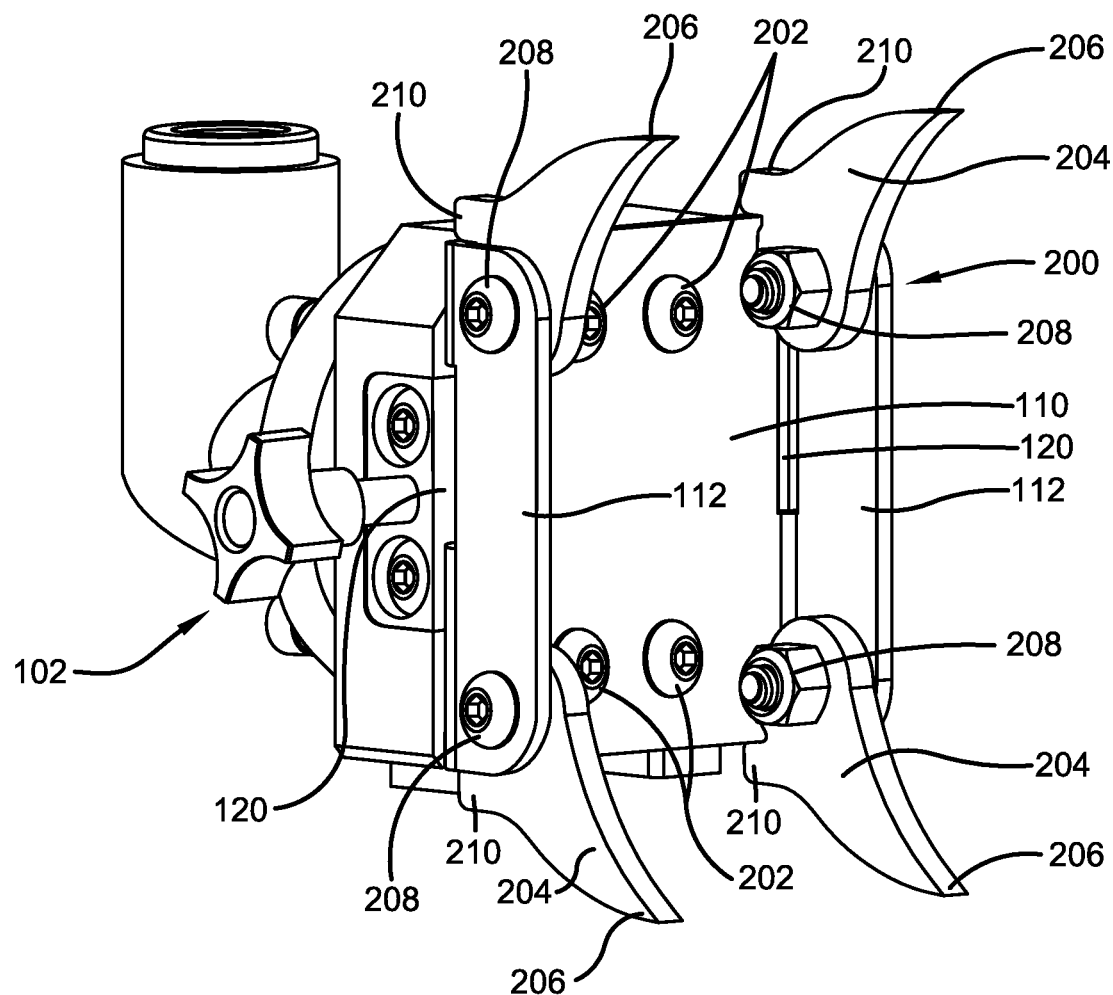
FIG. 6 is a view of the FIG. 5 configuration with the mount elements in the deployed condition.

FIGS. 5-6 depict a second exemplary configuration of a mounting bracket which is indicated generally by the reference numeral 200. Mounting bracket 200 shares elements with mounting bracket 100 and the same reference numerals are used to identify these features. In this configuration, front wall 110 defines holes so that utility mount 102 can be secured to mounting bracket 200 with fasteners 202 such as machine screws. When fasteners are used, mounting bracket 200 is not required to include mount 114. Connected the two together is desirable when the user takes both utility mount 102 and mounting bracket 200 with him when he leaves a hunting location. To make such transport more convenient, mounting bracket 200 includes mount elements 204 that are selectively movable with respect to sidewalls 112 between stored (FIG. 5) and deployed (FIG. 6) conditions. When in the stored configuration, engagement ends 206 of mount elements 204 are disposed between sidewalls 112 for protection against snagging in the user's pockets or pack. In addition, the overall size of the combination is reduced so that it occupies less space during transport.

Mounting bracket 200 includes four storable mount elements 204 including two upper mount elements and two lower mount elements. Each mount element 204 is connected to a portion of one of sidewalls 112 with a fastener 208 that allows mount element 204 to move between its stored and deployed conditions. When in the deployed condition, all engagements ends 206 point rearwardly with respect to sidewalls 112 as shown in FIG. 6. Each mount element 204 includes a stop 210 that engages an end of front wall 110 to stop rotation of mount element 204 when mount element 204 is in the deployed condition. When in the stored conditions, two of mount elements 204 are rotated in toward front wall 110 until engagement ends 206 touch the rear surface of front wall 110. The other two mount elements 204 are rotated on top of those. When stored, all four engagement ends 206 are disposed between sidewalls 112 to keep them out of the way.

In the deployed condition of FIG. 6, the two upper mount elements 204 are disposed above (and rearwardly of) the top of front wall 110 and the two lower mount elements 204 are disposed below (and rearwardly of) the bottom of front wall 110.

Figure 7:
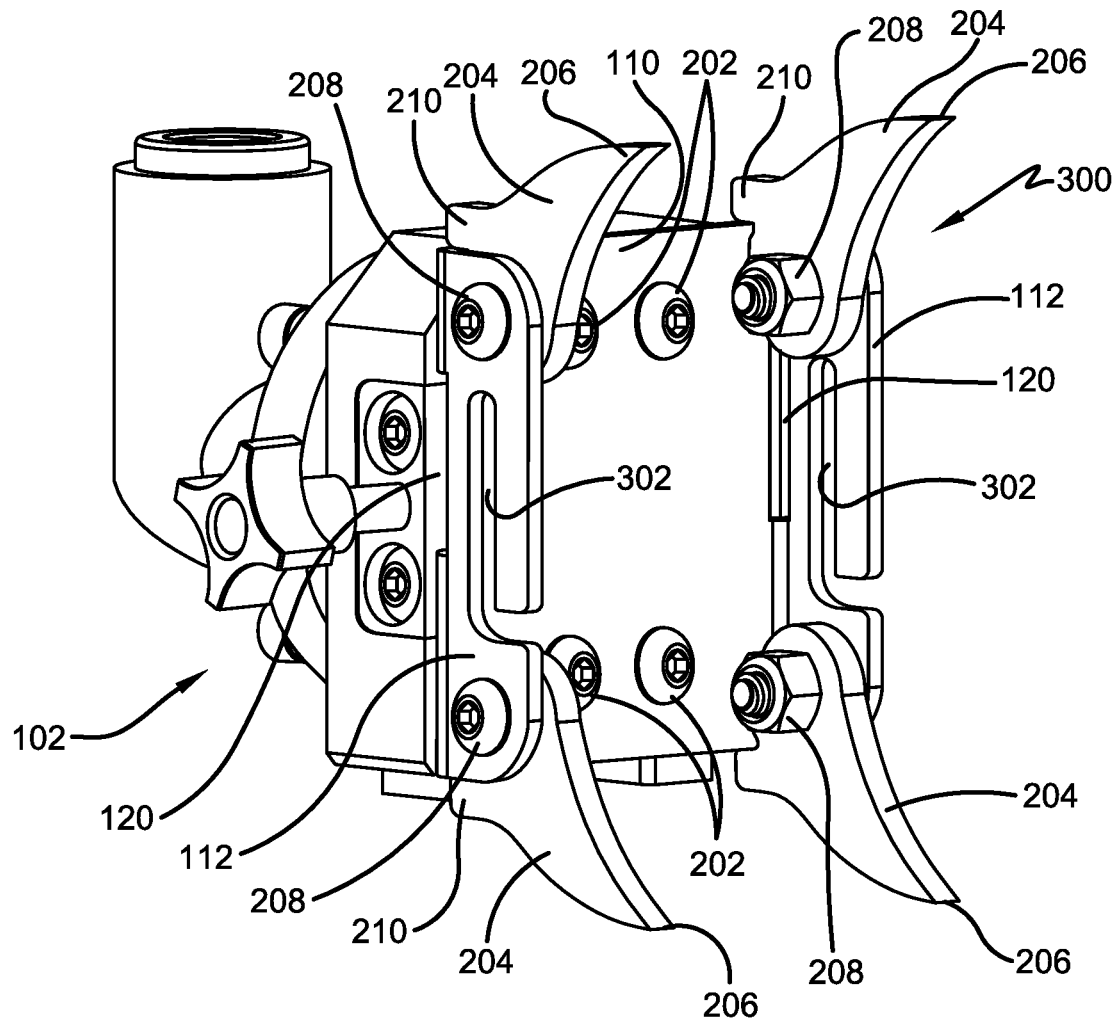
FIG. 7 is a view of a third configuration of a utility mount mounting bracket.

A third exemplary configuration of a mounting bracket is indicated generally by the reference numeral 300 in FIG. 7. Mounting bracket 300 shares elements with mounting brackets 100 and 200 and the same reference numerals are used to identify these features. In this configuration, sidewalls 112 define slots 302 that allow the user to slide mounting bracket 300 over or off of a mounting strap 12 that is already installed. This allows the user to install and remove mounting bracket 300 without threading strap 12 through openings 120. Each slot 302 has an upper closed end and an open lower end.

Figure 8:
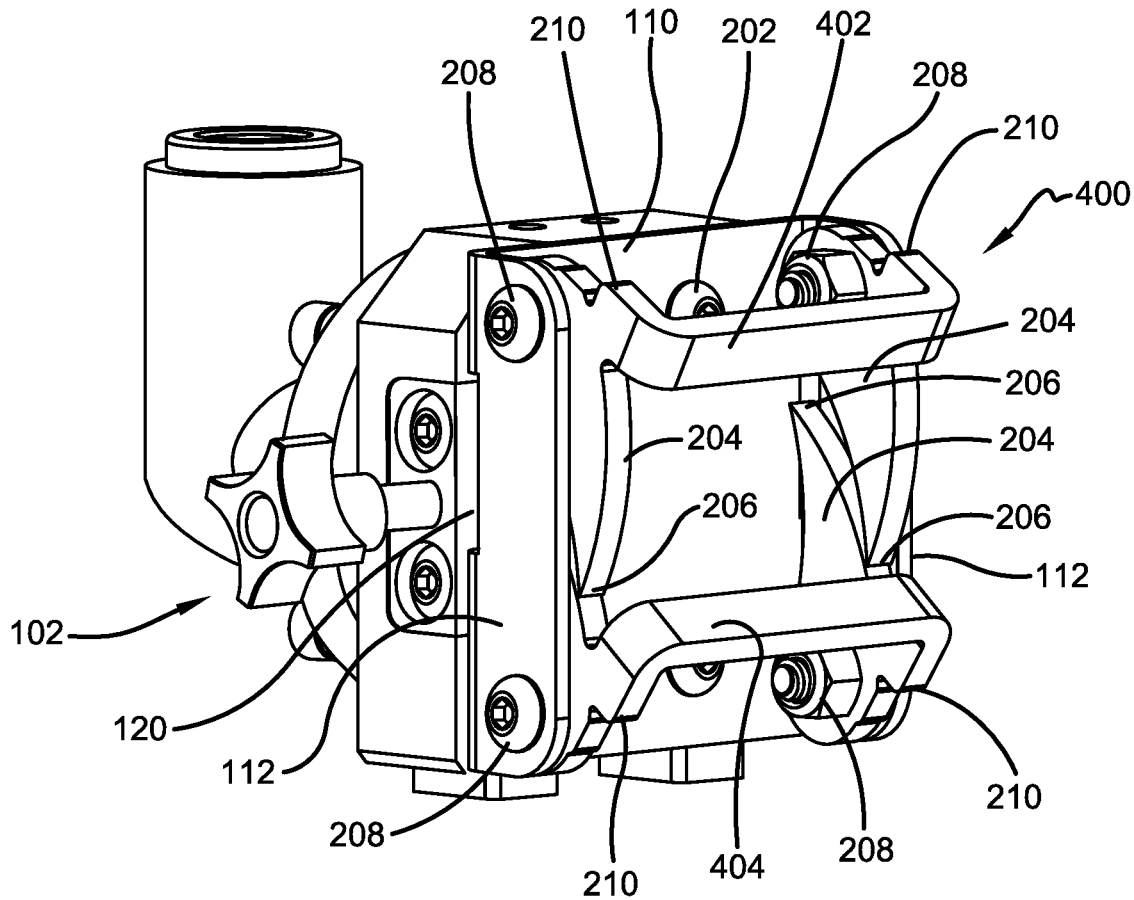
FIG. 8 is a view of a third configuration of a utility mount mounting bracket with storable mount elements in the stored condition.
Figure 9:
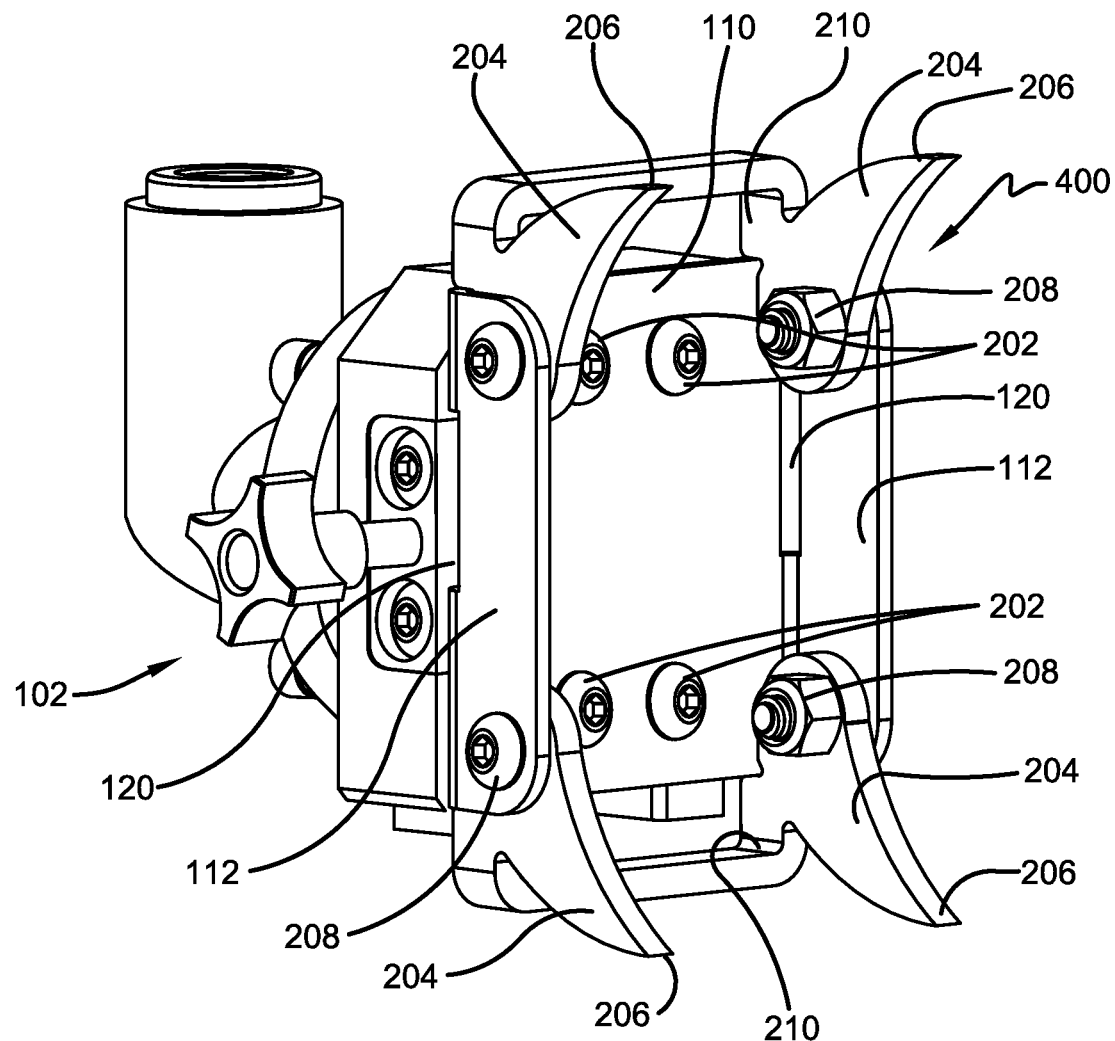
FIG. 9 is a view of the FIG. 8 configuration with the mount elements in the deployed condition.

A fourth exemplary configuration of a mounting bracket is indicated generally by the reference numeral 400 in FIGS. 8-9. Mounting bracket 400 shares elements with mounting brackets 100 and 200 and the same reference numerals are used to identify these features. Mounting bracket 400 includes an upper handle 402 that extends between upper mount elements 204 and a lower handle 404 that extends between lower mount elements 204. Handles 402 and 404 allow the user to move two mount elements at the same time and provides a grip for the user when carrying mounting bracket 400. Each handle 402 and 404 is U-shaped and is connected at stops 210.

Figure 10:
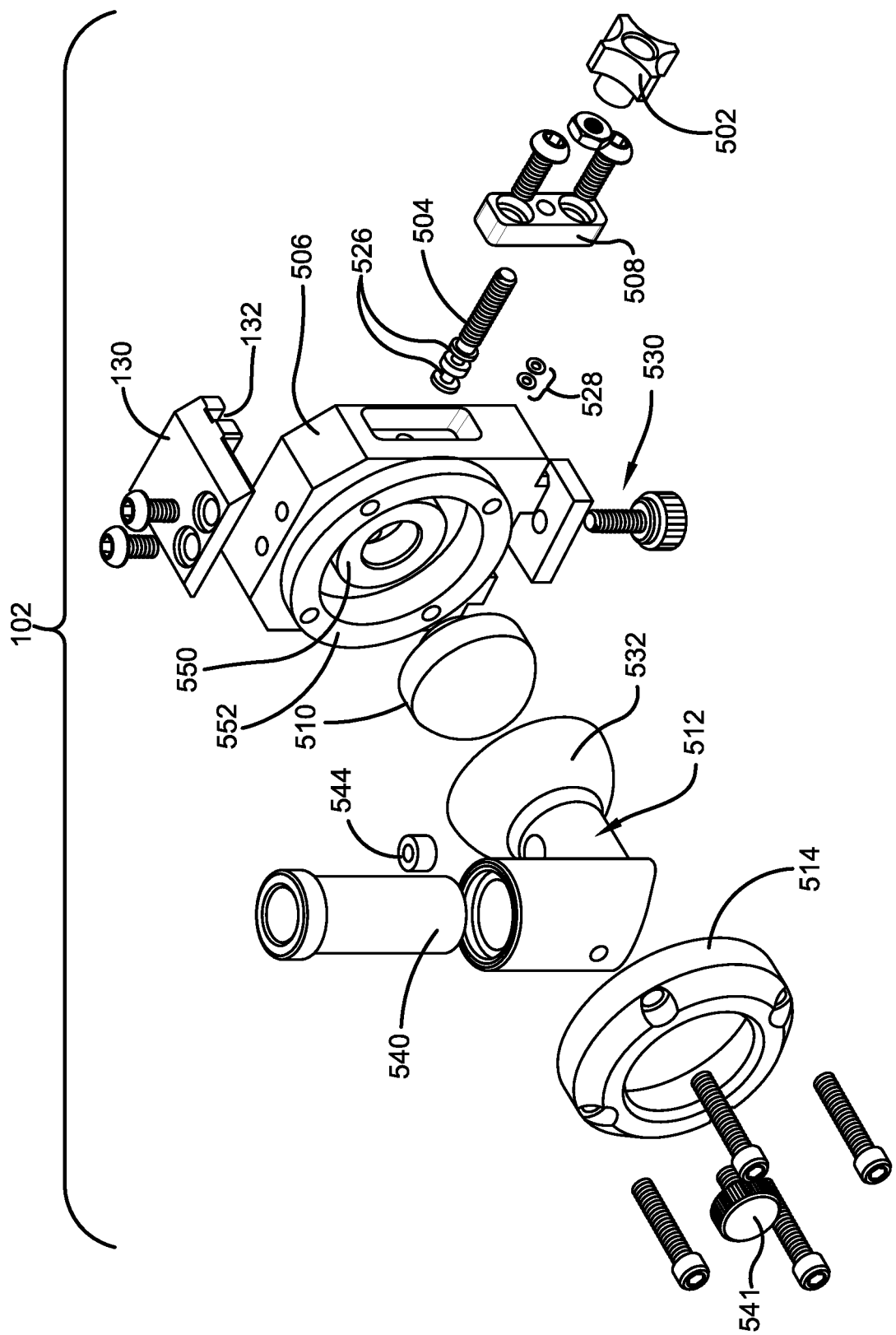
FIG. 10 is an exploded view of the utility mount.

An exploded view of exemplary hydraulic utility mount 102 is shown in FIG. 10. Utility mount 10 is used to hold or mount a device to a stable structure 14 such as a portion of a tree and maintain the device in a desired position during use. The position of the device being held can be adjusted by unlocking utility mount 102, adjusting the position of device being held by utility mount 102, and then re-locking utility mount 102. This configuration of utility mount 102 does not require a tool to be locked and unlocked. The user can lock and unlock utility mount 102 by turning a finger knob 502. Finger knob 502 is connected to a plunger 504 which is threaded to a mount body 506 (or a threaded insert 508) which allows plunger 504 to move in and out with respect to mount body 506. The inner end of plunger 504 engages hydraulic fluid disposed in a chamber between the inner end of plunger 504 and the inner end of a piston 510. Moving plunger 504 inwardly by clockwise rotation to an engaged condition pushes the hydraulic fluid against piston 510 causing the outer end of piston 510 to push against device mount 512 to lock device 512 in place against an inner surface of a cup ring 514. Turning finger knob 502 counterclockwise places plunger 504 in a disengaged condition and releases the pressure on the hydraulic fluid so that the position of device mount 512 can be adjusted.

Figure 11:
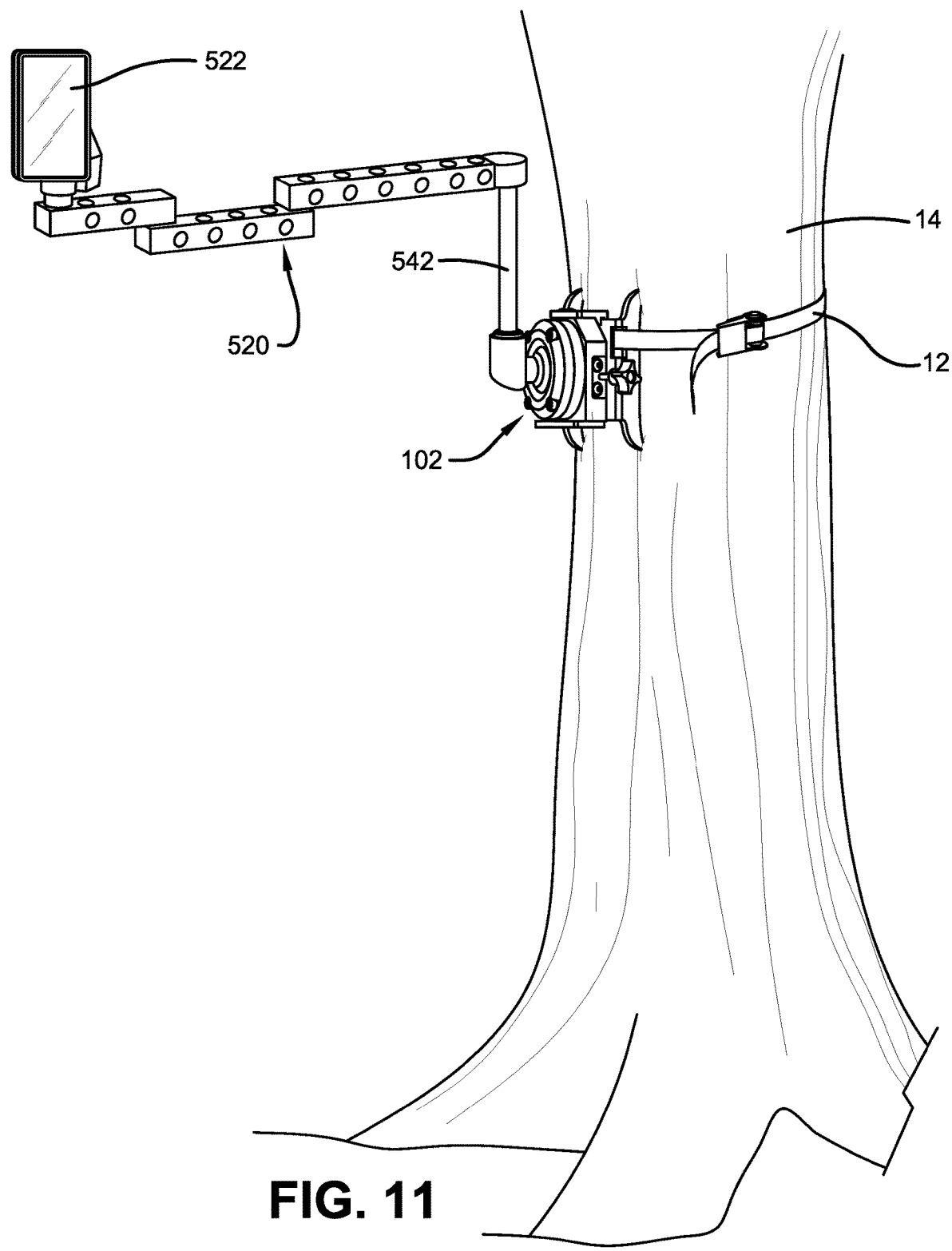
FIG. 11 is a view depicting a camera and camera arm carried by the utility mount.
Figure 12:
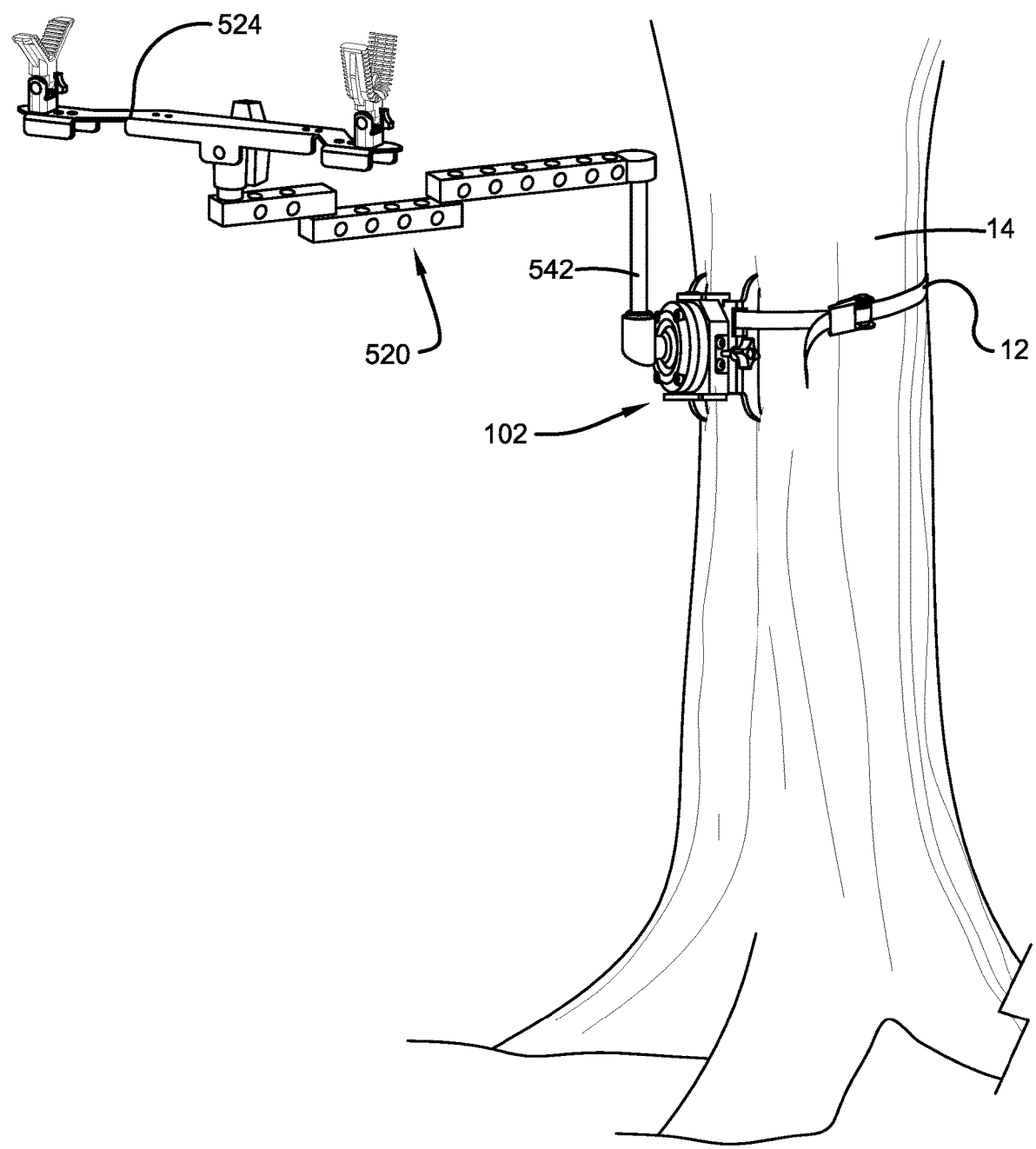
FIG. 12 is a view depicting a shooting rest and arm carried by the utility mount.

Adjustable utility mount 102 is used to support items such as an articulating arm 520 (FIGS. 11 and 12), a camera 522, a camera holder (or combination of both), a stick, a shooting rest 524, a motion detector, or a light. Adjustable utility mount 102 can also be used to support camouflage, used directly as a gun rest, used as an equipment holder, or to support other gear.

Finger knob 502 can be connected to or integral with plunger 504. Finger knob 502 can be fixed to plunger 504 or removable and replaceable. In the exemplary configuration, finger knob 502 allows the user to adjust the position of plunger 504 without using a tool. In other configurations, finger knob 502 is not used and the outer end of plunger 504 is configured to receive a tool such as a screwdriver or a wrench which are used to adjust the position of plunger 504 with respect to mount body 506.

Plunger 504 includes an elongated threaded portion that threadedly engages mount body 506 directly or threadedly engages a threaded insert 508 that is fastened to mount body 506. Insert 508 can be removed and replaced from mount body 506. Insert 508 allows plunger 504 to be threaded into the insert 508 from the body-facing side of insert 508. The inner end portion of plunger 504 which defines the plunger seal seats 526 and carries seals 528 is then slid into a plunger cavity that is defined by mount body 506. Seals 528 carried by plunger 504 engage the inner surface of mount body 506 that defines the plunger cavity to prevent hydraulic fluid from exiting the fluid chamber of mount body 506 past plunger 504.

Mount body 506 can be secured to mounting bracket 100 by inserting it lower portion into opening 116 and using lock plate 130 as described above. A lower clamp 530 is used to tighten mount body 506 to mounting bracket 100. Alternatively, mount body 506 can be secured with fasteners 202.

A cup ring 514 is removably connected to mount body 506 to allow a ball end 532 of device mount 512 to be positioned between the inner surface of cup ring 514 and the forward or outer surface of the front of piston 510. Cup ring 514 can be connected with fasteners or with an interlocking mount configuration such as a bayonet-style connection. When installed as shown in FIG. 4, the forward or outer surface of ball end 532 engages the inner surface of cup ring 514 and the forward or outer surface of piston 510 engages the rear or inner concave surface of ball end 532. The inner surface of cup ring 514 can be curved to correspond to the outer curbed surface of ball end 532. Similarly, the concave inner surface of ball end 532 can be curved to correspond to the curved outer surface of piston 510. When plunger 504 to moved inwardly with respect to mount body 506, the fluid pushes piston 510 against ball end 532 which is then trapped against cup ring 514 to lock the position of device mount 512. Cup ring 514 defines a large opening that allows device mount 512 to swivel with respect to mount body 506. Device mount 512 can rotate 360 degrees. The swivel movement can be combined with the rotation to allow the position of device mount 512 to be fully adjustable.

Device mount 512 is provided in different configurations for different devices to be mounted. In the exemplary configuration, device mount 512 includes a stem that projects forward from ball head 532 and a cylinder that is connected at a right angle to the stem. An insert 540 is slid into the cylinder and can be locked in place with a thumb screw 541. Insert 540 is configured to receive cylindrical mounts 542 (see FIGS. 11 and 12) from various items. In other configurations, device mount 512 can carry a standard threaded camera connector (¼-20 UNC or ⅜-16 UNC thread) so that a camera can be connected directly to device mount 512. In a further configuration, device mount 512 carries an adjustable clamp that engages the sides of a smart phone or tablet computer. Device mount 512 can carry a level 544.

Mount body 506 includes inner 550 and outer 552 concentric rings projecting forward from the front face of mount body 506. A ring-shaped channel is defined between rings 550 and 552 to receive the rear portions of ball head 532 when device mount 512 is tilted with respect to mount body 506. Cup ring 514 is mounted to outer ring 552 and can have the same outer and inner diameters so that the two match.

The inner surface of inner ring 550 can define at least a portion of the cylinder in which the rear end of piston 510 slide and seals. The front of mount body 506 also can define a portion or all of the cylinder. The rear end of piston 510 defines a seal groove and carries a seal that engages the surface that defines the cylinder to seal the fluid in the mount body 506. The hydraulic fluid is carried by mount body 506 in fluid communication between piston 510 and plunger 504. Mount body 506 includes a sealable fluid port opposite the plunger opening where the fluid can be added or removed as needed.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the description and illustration of the invention is an example and the invention is not limited to the exact details shown or described. Modifications and alterations of those embodiments will be apparent to one who reads and understands this general description. The present disclosure should be construed as including all such modifications and alterations insofar as they come within the scope of the appended claims or equivalents thereof. Throughout the description and claims of this specification the words "comprise" and "include" as well as variations of those words, such as "comprises," "includes," "comprising," and "including" are not intended to exclude additives, components, integers, or steps.

The invention claimed is:

1. A mounting bracket that is used to mount a device to a stable structure, the mounting bracket comprising:
    a bracket body having a front wall having an upper end and a lower end;
    the bracket body having a first sidewall and a second sidewall;
    the first and second sidewalls projecting rearwardly from the front wall;
    an upper mount element and a lower mount element connected to each sidewall; each mount element being movable between a stored condition and a deployed condition;
    an engagement end of each of the upper mount elements being positioned rearwardly of the front wall and above the upper end of the front wall when the upper mount elements are in the deployed condition;
    the engagement end of each of the upper mount elements being positioned rearwardly of the front wall and below the upper end of the front wall when the upper mount elements are in the stored condition;
    an engagement end of each of the lower mount elements being positioned rearwardly of the front wall and below the lower end of the front wall when the lower mount elements are in the deployed condition;
    the engagement end of each of the lower mount elements being positioned rearwardly of the front wall and above the lower end of the front wall when the lower mount element is in the stored condition; and
    wherein at least one of the mount elements includes a stop that engages an end of the front wall when the mount element is in the deployed condition.

2. The mounting bracket of claim 1, wherein at least the lower mount elements have pointed engagement ends.

3. The mounting bracket of claim 1, wherein at least the upper mount elements have pointed engagement ends.

4. The mounting bracket of claim 1, wherein all of the mount elements have pointed engagement ends.

5. The mounting bracket of claim 4, wherein the engagement ends of the mount elements are disposed between the sidewalls when the mount elements are in the stored condition.

6. The mounting bracket of claim 1, wherein the bracket body defines a strap opening between each sidewall and the front wall.

7. The mounting bracket of claim 1, wherein each of the sidewalls defines a slot adapted to receive a mounting strap.

8. The mounting bracket of claim 7, wherein each slot has an upper closed end and an open lower end.

9. The mounting bracket of claim 1, wherein the upper mount elements are connected by an upper handle.

10. The mounting bracket of claim 1, wherein the lower mount elements are connected by a lower handle.

11. The mounting bracket of claim 1, wherein portions of each of the mount elements are disposed between the sidewalls when the mount elements are disposed in the stored condition.

12. A mounting bracket that is used to mount a device to a stable structure, the mounting bracket comprising:
    a bracket body having a front wall having a front surface, a rear surface, an upper end and a lower end;
    the bracket body having a first sidewall and a second sidewall; the first sidewall being connected to the front wall at a first edge of the front wall and the second sidewall being connected to the front wall at a second edge of the front wall;
    the bracket body adapted to mount a device;
    an upper mount element and a lower mount element connected to each sidewall; each mount element being movable between a stored condition and a deployed condition;
    each of the upper and lower mount elements having an engagement end;
    wherein the engagement ends of the mount elements are disposed between the sidewalls when the mount elements are in the stored condition; and
    the bracket body defining first and second strap openings; the first strap opening being located at the first edge of the front wall between the front wall and the first sidewall and the second strap opening being located at the second edge of the front wall between the front wall and the second sidewall; the first and second strap openings adapted to allow a strap to pass outwardly of the sidewalls and along the rear surface of the front wall.

13. The mounting bracket of claim 12, wherein each of the sidewalls defines a slot adapted to receive a mounting strap.

14. The mounting bracket of claim 13, wherein each slot has an upper closed end and an open lower end.

15. The mounting bracket of claim 12, wherein the upper mount elements are connected by an upper handle and spaced apart by a length of the upper handle.

16. The mounting bracket of claim 12, wherein the lower mount elements are connected by a lower handle and spaced apart by a length of the lower handle.

17. The mounting bracket of claim 12, wherein at least one of the mount elements includes a stop that engages an end of the front wall when the mount element is in the deployed condition.

18. A mounting bracket that is used to mount a device to a stable structure, the mounting bracket comprising:

a bracket body having a front wall having an upper end and a lower end;
first and second sidewalls extending rearwardly from the front wall;
an upper mount element and a lower mount element connected to the bracket body;
each mount element being movable between a stored condition and a deployed condition;
an engagement end of the upper mount element being positioned rearwardly of the front wall and above the upper end of the front wall when the upper mount element is in the deployed condition;
the engagement end of the upper mount element being positioned rearwardly of the front wall and below the upper end of the front wall when the upper mount element is in the stored condition;
an engagement end of the lower mount element being positioned rearwardly of the front wall and below the lower end of the front wall when the lower mount element is in the deployed condition; and
the engagement end of the lower mount element being positioned rearwardly of the front wall and above the lower end of the front wall when the lower mount element is in the stored condition.

19. The mounting bracket of claim 18, wherein the upper mount elements are connected by an upper handle and spaced apart by a length of the upper handle.

20. The mounting bracket of claim 18, wherein the lower mount elements are connected by a lower handle and spaced apart by a length of the lower handle.

* * * * *